United States Patent [19]

Matsuura

[11] Patent Number: 4,514,433

[45] Date of Patent: Apr. 30, 1985

[54] PROCESS FOR PRODUCING AN ASEPTIC PACKED TOFU

[75] Inventor: Masaru Matsuura, Noda, Japan

[73] Assignee: Kikkoman Corporation, Noda, Japan

[21] Appl. No.: 544,379

[22] Filed: Oct. 21, 1983

[30] Foreign Application Priority Data

Oct. 22, 1982 [JP] Japan ............................ 57-184674
Feb. 23, 1983 [JP] Japan ............................ 58-27668

[51] Int. Cl.³ .......................... A23J 3/00; A23L 1/20
[52] U.S. Cl. .................................. 426/634; 426/401
[58] Field of Search ............... 426/656, 399, 401, 407, 426/408, 412, 526, 521, 573, 325, 322, 634, 582, 598

[56] References Cited

U.S. PATENT DOCUMENTS 3,908,031 9/1975 Wistreich et al. ............... 426/521
4,000,326 5/1976 Okada .
4,140,811 2/1979 Ogasa et al. ..................... 426/582

*Primary Examiner*—Raymond Jones
*Assistant Examiner*—Marianne S. Minnick
*Attorney, Agent, or Firm*—Banner, Birch, McKie & Beckett

[57] ABSTRACT

A process for producing an aseptic packed tofu by grinding soybean at 40° to 50° C. to obtain a soybean slurry, heating the soybean slurry at 80° to 100° C. and then filtering the heated soybean slurry to obtain a soybean milk, heat-sterilizing the soybean milk at a temperature not lower than 130° C. for at least 1 second, aseptically adding a sterilized coagulant to the sterilized soybean milk, mixing them, aseptically packing the mixture into a sterilized container and sealing the container, followed by heating the sealed mixture at 70° to 100° C. to coagulate it.

10 Claims, 4 Drawing Figures

PROCESS FOR PRODUCING AN ASEPTIC PACKED TOFU

This invention relates to a process for producing a novel aceptic packed tofu.

Since the development of gluconodeltalactone (hereinafter referred to as GDL) as a coagulant for tofu, production of a packed tofu in a large quantity has become a reality. The advent of this packed tofu which can be easily produced and has storage stability for a certain period of time has created a new distribution channel of tofu.

However, in the conventional production process, production of a packed tofu in a large quantity is assured as above but production of an aceptic packed tofu which can be stored for a long period of time is impossible. In order to solve this problem, various processes have been proposed for producing an aseptic packed tofu which can be stored for a long period of time even at the normal temperature.

Processes for producing an aceptic packed tofu are largely classified into (a) process wherein a sterilized soybean milk is aseptically treated and (b) a process wherein a packed soybean milk is finally subjected to coagulation and heat sterilization treatment (retort sterilization treatment). For the purpose of obtaining a better quality tofu, the former process is superior to the latter although the operation of the former is troublesome.

The tofu produced by the above process (a) tends to have a quality inferior to that of a conventionally produced tofu. As processes for aseptically treating a sterilized soybean milk, there is known, for example, a process described in U.S. Pat. No. 4,000,326. In these processes, a soybean milk need be heat-sterilized at a high temperature to obtain a sterilized soybean milk and this heating at a high temperature causes the insolubilization of proteins present in the soybean milk leading to deterioration in skin texture and feel to the palate of a finished tofu. For this reason, these processes have been unable to provide an aseptic packed tofu having a quality equivalent to that of a conventionally produced tofu.

The present inventor found that the soybean slurry obtained by grinding soybean at 40° to 60° C. gives a strikingly low foaming at the time of its heating conducted for purposes of protein extraction, protein denaturation, etc. In the subsequent thorough investigation on conditions of the above grinding, the inventor further found that, surprisingly, a soybean milk obtained by grinding soybean at 40° to 50° C. and then filtering the ground soybean, compared with a soybean milk obtained by grinding soybean at the room temperature or at a high temperature, gives a lower ratio of insolubilization of proteins present in soybean milk, in high temperature sterilization and that an aseptic packed tofu produced from this soybean milk is fine in skin texture and excellent in feel to the palate. The present inventor furthermore found that, as a sterilized coagulant for soybean milk, there can be used a solution which is obtained by immersing GDL in a 70 to 80% aqueous ethanol solution, sterilizing them and adding thereto sterilized water so that the ethanol concentration becomes 10 to 30% and the GDL concentration becomes 20 to 30%. Based on these findings, the present invention has been accomplished.

An object of the present invention is to provide an aseptic packed tofu having excellent quality as well as a process for producing said tofu.

Further objects and advantages of the present invention will be made clear by the following description.

In the accompanying drawings.

Figure 1:
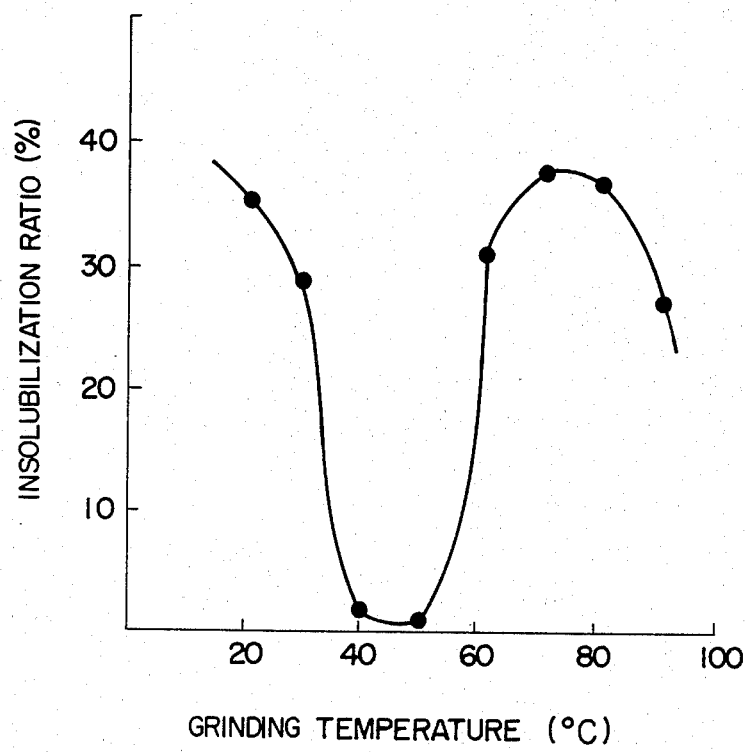
FIG. 1 shows a relationship between grinding temperature of raw material soybean and insolubilization ratio of proteins present in soybean milk, in Experiment 2 which is described later.

That is, the present invention provides a process for producing an aseptic packed tofu comprising (a) a step of grinding soybean at 40° to 50° C. to obtain a soybean slurry, (b) a step of heating the soybean slurry at 80° to 100° C. and then filtering the heated soybean slurry to obtain a soybean milk, (c) a step of heat-sterilizing the soybean milk at a temperature not lower than 130° C. for at least 1 second, (d) a step of aseptically adding a sterilized coagulant to the sterilized soybean milk, mixing them, aseptically packing the mixture into a sterilized container and sealing the container, and (e) a step of heating the sealed mixture at 70° to 100° C. to coagulate it.

The present invention will be explained specifically below by way of each sequential production step.

Step (a) (Grinding Treatment)

Whole soybeans or dehulled soybeans are ground at a temperature of 40° to 50° C. These soybeans are subjected to grinding as they are, or after washing, or after soaking in water of, for example, a 3-fold to 5-fold weight relative to dry soybeans, for 12 to 20 hr at the room temperature (15° to 25° C.) followed by water drainage.

It is necessary that the grinding be conducted at a temperature in the range of 40° to 50° C. In order to achieve this, various grinding methods can be employed such as a method wherein soybeans are placed in a grinder together with water of 45° to 55° C. and of a 4-fold to 6-fold weight relative to dry soybeans. (The water temperature of 45° to 55° C. is lowered to 40° to 50° C. at the time of grinding by the cooling effect of soybeans.) Any grinding method can be used so long as a water temperature of 40° to 50° C. is kept at the time of grinding.

Step (b) (Heating and Filtering of Soybean Slurry)

The soybean slurry obtained in Step (a) is heated at 80° to 100° C. and then filtered. This operation aims at dissolution of soybean proteins in water or their denaturation by heat. This heating operation is not substantially different from heating operations conducted for soybean slurry in ordinary tofu production such as the one of blowing steam directly into a soybean slurry.

A soybean slurry produced by an ordinary grinding causes severe foaming when heated and addition of deformant is necessary. On the other hand, the soybean slurry according to the present invention gives low foaming and a defoamant is not required or, if added, is sufficient in a small amount.

Experiments for foaming of soybean slurry were conducted as follows.

Experiment 1

Whole soybeans were soaked for 16 hr in tap water of the room temperature and of a 4-fold weight. Then, it was drawn up from the water. To the resulting soybeans were added the water or hot water of a temperature shown in Table 1 and of a 5-fold weight relative to dry soybeans. Using a table type homogenizer (HB type manufactured by Nihon Seiki Seisakusho), the soybean-water mixture was subjected to grinding while keeping the temperature during grinding constant by cooling or warming the outer wall of a grinding container, whereby a soybean slurry was obtained.

The soybean slurry obtained was put in a 500 ml beaker with 50 ml graduation. The beaker keeping the slurry were heated at 98° C. for 3 min. in a boiling water, and the level of foaming when heated was measured.

TABLE 1

| Sample | Temperature at grinding, °C. | Foaming, ml* |
| --- | --- | --- |
| 1 | 25 | 350 |
| 2 | 30 | 275 |
| 3 | 40 | 175 |
| 4 | 50 | 127 |
| 5 | 60 | 94 |
| 6 | 70 | 200 |
| 7 | 80 | 210 |

*Is expressed in terms of total volume of slurry and foam when the slurry was heated and foaming showed the biggest volume.

After heating, the soybean slurry is filtered by conventional method such as a method using a filtering cloth or a screen to obtain a soybean milk.

As is obvious from Table 1, grinding at a temperature of 40° to 60° C. is effective from the standpoint of foaming. However, as described later, grinding at 60° C. is not effective from the standpoints of insolubilization of proteins and skin texture of tofu.

Step (c) (Heat Sterilization)

The soybean milk obtained in Step (b) is heat-sterilized at a temperature not lower than 130° C. for at least 1 second preferably 1 to 5 seconds. This step aims at complete sterilization of heat-tolerance Bacillus spores remaining in the soybean milk. In order to attain this, a temperature of at least 130° C., preferably 130° to 150° C. is required for safety.

The heating time is about 1 to 5 seconds. Heating of a longer time makes a finished tofu soft and is not desirable.

In the heat sterilization treatment, a known sterilizing machine such as a plate type or a direct steam heating type can be optionally used. In the plate type sterilizing machine, curd (scale) adheres on the plate depending upon the concentration of soybean milk and sterilizing temperature, whereby continuous operation of the machine for long hours becomes difficult and the protein concentration in soybean milk allowed for this machine is limited to 4.5% at the highest. In the soybean milk according to the present invention, as is obvious from Table 2 which is described later, the ratio of insulubilization of proteins after heating treatment at a high temperature is extremely low. Hence, adherence of curd on the plate hardly occurs and the plate type sterilizing machine can be used more advantageously.

Incidentally, when the soybean milk is, prior to heat sterilization treatment, subjected to homogenizing treatment at about 200 to 400 kg/cm² by the use of a high pressure homogenizer, the texture of a finished tofu is improved and further, when the plate type sterilizing machine is used, formation of curd on the plate becomes less.

Experiment 2

Whole soybeans were soaked for 16 hr in tap water of a 4-fold weight and of the room temperature and then drawn up. The soybeans were ground at a temperature shown in Table 2 by the use of a grinder (homomic Line Mill Model LM-S manufactured by Tokushukika Kogyo) while adding water or hot water of a 5-fold weight relative to dry soybeans to obtain a soybean slurry. The slurry was heated for 1 min. at 95° C. and then filted by the use of a filtering cloth to obtain soybean milk. The soybean milk had a protein concentration of 5.3% (solid concentration: 10%).

Each of the thus obtained soybean milks was subjected to heat sterilization treatment for 5 seconds at 130° C. by the use of a plate type sterilizing machine. Then, the ratio of insolubilization of proteins was measured. The results are shown in Table 2 and FIG. 1.

As is obvious from Table 2 and FIG. 1, soybean milks obtained from grinding of 40° C. and 50° C. gave extremely low ratios of protein insolubilization, after heat sterilization treatment.

TABLE 2

| Sample | Temperature at grinding, °C. | Ratio of insolubilization, %* |
| --- | --- | --- |
| 1 | 20 | 35 |
| 2 | 30 | 28 |
| 3 | 40 | 3 |
| 4 | 50 | 1 |
| 5 | 60 | 32 |
| 6 | 70 | 38 |
| 7 | 80 | 37 |
| 8 | 90 | 27 |

*The soybean milk subjected to sterilization treatment was centrifugated for 10 min. at 2000 rpm (350 G). Ratio of insolubilization was represented as the percentage of (total nitrogen concentration in soybean milk before centrifugation minus total nitrogen concentration in supernatant after centrifugation) divided by total nitrogen concentration in soybean milk before centrifugation.

Further, a 25% agueous solution of GDL was added to each sterilized soybean milk in a quantity of 1% by volume. After mixing, the resulting soybean milk was packed in a container. After sealing, the container was immersed in hot water of 95° C. for 30 min. to coagulate the soybean milk. The textures of the tofus obtained were observed. Samples 3 and 4 (ground at 40° C. and 50° C., respectively) had finer and more glossy textures than other samples and were unparalleledly superior In order to make this advantageous effect clearer, sections of tofus obtained from samples 1, 4 and 7 were dyed with an alkaline phenol reagent and then photographs of 16 magnification were taken for the dyed tofu sections by the use of a stereomicroscope. The photographs taken are shown in FIG. 2 (sample 1), FIG. 3 (Sample 4) and FIG. 4 (sample 7).

Figure 2:
FIGS. 2 to 4 show microphotographs for sections of tofus obtained in Samples 1, 4 and 7 in Experiment 2.
Figure 3:
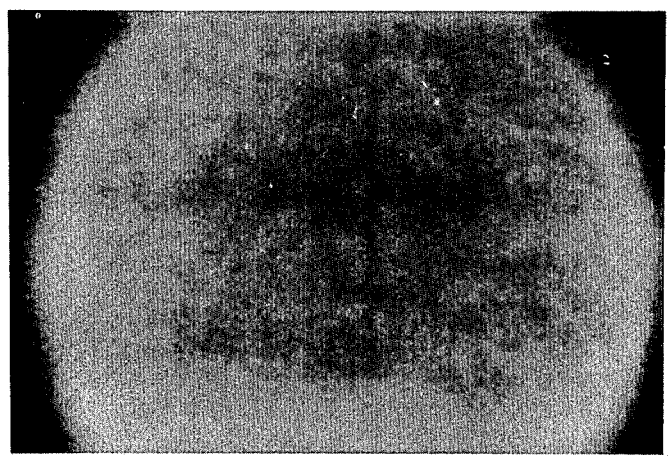
Figure 4:
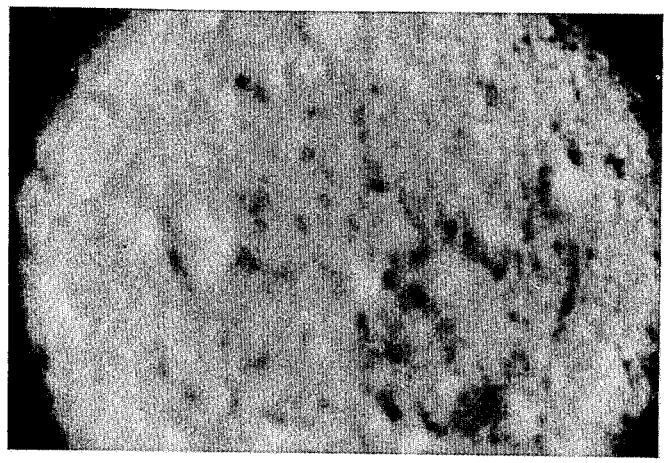

Comparison of FIGS. 2 to 4 clearly shows that the tofu according to the present invention had a more smooth texture than other samples.

Step (d) (Sterile Filling)

To the sterilized soybean milk obtained in step (c) is aseptically added a sterilized coagulant such as GDL alone or in combination with a salt of a bivalent metal, and they are mixed. The resulting soybean milk is aseptically packed in a sterilized container and the container is sealed.

Specifically, a sterilized coagulant is prepared as follows. GDL is dissolved in water or a 10 to 30% aqueous ethanol solution in a coagulant dissolution tank so that the GDL concentration becomes 20 to 30%. The resulting aqueous solution is passed through a millipore membrane filter manufactured by Millipore Limited at a flow rate of 1 L/min to make the solution germ-free. When a salt of a bivalent metal such as calcium chloride, magnesium chloride or the like is used together, the salt is added to a GDL solution in a quantity of 2 to 10% based on the GDL solution, and then the mixture is stirred.

Alternatively, GDL is immersed in a 70 to 80% aqueous ethanol solution for sterilization. By adding a sterilized water thereto, a sterilized coagulant solution having an ethanol concentration of 10 to 30% and a GDL concentration of 20 to 30% can be prepared.

As another alternative, an aqueous solution containing 0.5 to 1.0 mole/L of calcium chloride and an aqueous solution containing 0.5 to 1.0 mole/L of magnesium sulfate are prepared. Each solution is passed through a millipore membrane filter for sterilization. The resulting two filtrates are mixed so that the ratio of the former filtrate to the latter filtrate roughly becomes 1:1 to 1:1.5. In the mixture, calcium chloride and magnesium sulfate react with each other to form a mixed solution of magnesium chloride and calcium sulfate. This mixed solution can be used as a sterilized coagulant.

As still another alternative, GDL is subjected to dry heat sterilization treatment for 10 to 15 min. at 130° to 150° C. and then dissolved in sterilized water to obtain a 20 to 30% aqueous solution. This GDL solution can be used as a sterilized coagulant.

At any rate, a sterilized coagulant can be prepared by any method so long as the coagulant is sterilized at the time of being added to a sterilized soybean milk.

The thus obtained coagulant solution is added to and mixed with a sterilized soybean milk in a quantity of 0.5 to 2.0% by volume based on sterilized soybean milk. This addition and mixing can be done by any method so long as it is done aseptically. For example, there can be employed a method wherein a sterilized coagulant solution is injected directly into a pipe through which a sterilized soybean milk is flowing, a method wherein a sterilized coagulant solution is added to and mixed with a sterilized soybean milk stored in a tank, and so forth.

The coagulant-added sterilized soybeam milk is aseptically packed in a sterilized heat-resistant and water-resistant container and then the container is sealed. For this purpose, known methods such as, for instance, the one disclosed in U.S. Pat. No. 4,000,326 are used advantageously. Also, the following methods can be used.

For example, when a sterile filling machine Model AB 8 manufactured by Tetra Pack Co. is used, a composite paper (a laminate of a paper as a substrate, an aluminum foil and a polyethylene film) is sterilized with hydrogen peroxide and then molded into a rectangular parallelepiped container, and subsequently a GDL-added soybean milk is aseptically packed into the container and finally the container is sealed, whereby sterile packing is completed. When a sterile filling machine of form-fill-seal type is used, a molded cup made of a polyethylene resin is supplied into a presterilized sterile chamber and sterilized with hydrogen peroxide, then a GDL-added soybean milk is packed into the cup, and the cup is sealed with a cover material sterilized with hydrogen peroxide, whereby sterile packing is completed. As examples of this type of sterile filling machine, there can be mentioned Model DN-AP manufactured by Dainippon Insatsu, a sterile filling machine of Höfliger & Karg Co., etc.

Step (e) (Coagulation)

The confined sterile soybean milk obtained in step (d) is heated at 70° to 100° C. so as to coagulate it. This step is same as the coagulation step in production of ordinary packed tofu. For example, the confined soybean milk is immersed together with the container in hot water of 70° to 100° C. for 20 to 60 min. or kept in an atmosphere full of steam of 100° C. for 10 to 30 min., for heating and coagulation. A final tofu product is obtained by cooling the coagulated soybean milk. This coagulation may be conducted by preheating in hot water and subsequent steam coagulation.

As explained in detail above, the present invention includes a process for producing a sterilized packed tofu by the steps (a) to (e). In this process, unsoaked soybeans or soaked soybeans are ground at 40° to 50° C. in place of that soaked soybeans are ground at the room temperature in the conventional known process for producing a sterilized packed tofu, whereby there are obtained meritorious advantages that the soybean slurry causes only a low level of foaming when heated, the ratio of protein insolubilization when the soybean milk is sterilized is low and the tofu obtained has a fine and excellent texture.

The present invention is further described below by way of the Examples but the invention is not limited thereto.

EXAMPLE 1

Whole soybeans were washed with water and soaked in tap water of a 4-fold weight for 16 hr at a room temperature. After water drainage, the soybeans were ground by a grinder (Model LM-S manufactured by Tokushukika Kogyo) while adding hot water of 55° C. and of a 5-fold weight relative to dry soybeans in order to keep the grinding temperature at 50° C., whereby a soybean slurry was obtained.

The soybean slurry was heated for 1 min. at 98° C. by introducing steam and then filtered by the use of a 100 mesh screen to obtain a soybean milk containing 5.1% of proteins.

The soybean milk was subjected to homogenizing treatment at a pressure of 400 kg/cm$^2$ by the use of a high pressure homogenizer (Model M manufactured by Manton Gaulin Co.) and then deaerated. Subsequently, the soybean milk was subjected to heat sterilization for 2 seconds at 140° C. by the use of a plate type sterilizing machine (Model P-20 manufactured by Alfa Lavel Co.) and pooled in a sterilized storage tank while cooling.

Separately, a 25% aqueous GDL solution was passed through a millipore membrane filter (SW-47 manufactured by Millipore Limited) to obtain a sterilized coagulant solution. This sterilized coagulant solution was added to the above sterilized soybean milk in a quantity of 1.0% by volume relative to soybean milk and they were mixed. This mixed solution was placed in a sterile atmosphere and aseptically packed in a plastic container presterilized with hydrogen peroxide. The container was then sealed with a cover material also presterilized with hydrogen peroxide, and immersed in hot water of 90° C. for 40 min. to coagulate the soybean milk, whereby an aseptic packed tofu was obtained.

The thus obtained tofu was fine in texture and excellent in taste and feel to the palate. Further, no change was seen when the tofu was stored for 2 months at the room temperature.

EXAMPLE 2

Whole soybeans were washed with water and soaked in tap water of a 4-fold weight to dry soybeans for 16 hr at 20° C. After water drainage, the soybeans were ground by a grinder (Model LM-S manufactured by Tokushukika Kogyo) while adding hot water of 50° C. and of a 5-fold weight relative to dry soybeans in order to keep the grinding temperature at 45° C., whereby a soybean slurry was obtained.

Steam was introduced into the soybean slurry. As soon as the soybean slurry reached 100° C., it was cooled. Then, the cooled soybean slurry was filtered through a 100 mesh screen to obtain a soybean milk containing 5.1% of proteins. This soybean milk was subjected to homogenizing treatment at a pressure of 200 kg/cm$^2$ by the use of a high pressure homogenizer (Model M manufactured by Manton Gaulin Co.) and then deaerated. Subsequently, the soybean milk was subjected to heat sterilization for 5 seconds at 130° C. by the use of a plate type sterilizing machine (Model P-20 manufactured by Alfa Lavel Co.) and pooled in a sterilized storage tank while cooling.

Separately, GDL and magnesium chloride were immersed in 75% ethyl alcohol for sterilization. The mixture was diluted with sterilized water so that the diluted mixture had an ethanol concentration of 10%. In the diluted mixture, the concentrations of GDL and magnesium chloride were 30% and 10%, respectively.

This coagulant solution was added to the above soybean milk in a quantity of 1.0% by volume relative to soybean milk and they were mixed. This mixed solution was placed in a sterile atmosphere and packed in a presterilized plastic container, and the container was sealed. The sealed container was preheated in hot water of 90° C. for 5 min. and then kept in an atmosphere full of steam of 100° C. for 20 min. to coagulate the soybean milk, whereby an aseptic packed tofu was obtained.

The tofu was fine in texture and excellent in taste and feel to the palate. Further, no change was seen when the tofu was stored for 2 months at the normal temperature.

EXAMPLE 3

Whole soybeans were washed with water and soaked for 16 hr at 20° C. in an aqueous solution of a 4-fold weight relative to dry soybeans which contained 0.1% of ascorbic acid and 0.15% of sodium hydrogen carbonate, to allow the soybeans to swell. After water drainage, the swollen soybeans were ground by a grinder (Model LM-3 manufactured by Tokushu Kika Kogyo) while adding hot water of 53° C. and of a 4.5-fold weight relative to dry soybeans before soaking, whereby a soybean slurry was obtained. At this time, the grinding temperature was 47° C.

Steam was introduced into the soybean slurry thus obtained. As soon as the soybean slurry reached 80° C., it was cooled down to 60° C. and centrifugated by a centrifugal force of 3000G, whereby a soybean milk and a insoluble residue were obtained separately.

This soybean milk was deaerated by passing through a deaerator and then cooled down to 25° C. to obtain a soybean milk containing 5.3% of proteins.

This soybean milk was preheated up to 80° C. by the use of a plate heater and then subjected to heat sterilization treatment for 2 seconds at 138° C. by passing the soybean milk through a pipe and introducing steam in the pipe. Subsequently, this sterilized soybean milk was introduced to a vacuum chamber to cool down it to 80° C. and then cooled further down to 25° C. by the use of a plate cooler. The cooled soybean milk was subjected to homogenizing treatment at a pressure of 150 kg/cm$^2$ by the use of an aceptic homogenizer (Model M manufactured by Manton Gaulin Co.) and then pooled in a sterilized tank.

Separately, an aqueous solution containing 30% of GDL and 10% of magnesium chloride was filtered through a millipore membrane filter having a pore size of 0.45 $\mu$ to obtain a sterilized coagulant. This coagulant was added to the above sterilized soybean milk in a quantity of 1% by volume relative to sterilized soybean milk in a pipe line and they were mixed. This mixed solution was placed in a sterile atmosphere and packed in a presterilized plastic container. The container was sealed and further vacuum-packed with an aluminum foil, and then kept in hot water of 95° C. for 40 min. to heat-coagulate the soybean milk, whereby an aseptic packed tofu was obtained.

This tofu had good quality after storage of 6 months at the room temperature. Further, it showed no quality change after storage of 1 year at low temperatures of 10° C. or lower.

EXAMPLE 4

Dehulled soybeans were ground as it was by the use of a Pin mill type wet grinder while adding hot water of 50° C. and of a 6-fold weight relative to dry soybean. The grinding temperature was 45° C. Steam was introduced into the resulting soybean slurry. As soon as the soybean slurry reached 80° C., it was cooled down to 60° C. Later operations were same as in Example 3, whereby an aseptic packed tofu was obtained.

This tofu had good quality after storage of 6 months at the room temperature.

What is claimed is:

1. In a process for producing an aseptic packed tofu comprising:
   (a) a step of putting into a grinder soybeans with 3–5 times their dry weight of water and grinding the soybeans to obtain a soybean slurry;
   (b) a step of heating the soybean slurry at 80° to 100° C. and then filtering the heated soybean slurry to obtain a soybean milk;
   (c) a step of heat-sterilizing the soybean milk at a temperature not lower than 130° C. for at least 1 second;
   (d) a step of aseptically adding a sterilized coagulant to the sterilized soybean milk, mixing them, aseptically packing the mixture into a sterilized container and sealing the container; and
   (e) a step of heating the sealed mixture at 70° to 100° C. to coagulate it, the improvement which comprises carrying out the step of grinding soybeans at 40° to 50° C.

2. A process according to claim 1, wherein the soybeans are whole soybeans or dehulled soybeans.

3. A process according to claim 1, wherein the grinding temperature is kept at 40° to 50° C. by putting into a grinder hot water of 45° to 55° C. and of a 4-fold to 6-fold weight relative to dry soybeans together with soaked soybeans.

4. A process according to claim 1, wherein the soybean milk is heat-sterilized after having been subjected to homogenizing treatment at a pressure of 200 to 400 kg/cm$^2$ by the use of a high pressure homogenizer.

5. A process according to claim 1, wherein the soybean milk is heat-sterilized for 1 to 5 seconds at 130° to 150° C.

6. A process according to claim 1, wherein the soybean milk is heat-sterilized by the use of a plate type heat-sterilizing machine.

7. A process according to claim 1, wherein the soybean milk is heat-sterilized by blowing steam directly into the soybean milk.

8. A process according to claim 1, wherein as the sterilized coagulant, a 20 to 30% aqueous gluconodeltalactone solution is used which has been filtered through a millipore membrane filter for germ removal.

9. A process according to claim 1, wherein as the sterilized coagulant, a gluconodeltalactone solution is used which is prepared by immersing gluconodeltalactone in a 70 to 80% aqueous ethanol solution for sterilization and adding thereto sterilized water so that the ethanol concentration and the gluconodeltalactone concentration become 10 to 30% and 20 to 30%, respectively.

10. A process according to claim 1, wherein as the sterilized coagulant, a 20 to 30% aqueous gluconodeltalactone solution is used which is prepared by subjecting gluconodeltalactone to dry heat sterilization for 10 to 15 minutes at 130° to 150° C. and then dissolving it in sterilized water.

* * * * *